(12) United States Patent
Nishigaki (10) Patent No.: US 8,839,665 B2
(45) Date of Patent: Sep. 23, 2014

(54) APPARATUS, VEHICLE, AND METHOD FOR DETERMINING A THERMOSTAT MALFUNCTION IN AN ENGINE COOLING SYSTEM

(75) Inventor: Takahiro Nishigaki, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 205 days.

(21) Appl. No.: 13/267,930

(22) Filed: Oct. 7, 2011

(65) Prior Publication Data

US 2012/0085157 A1   Apr. 12, 2012

(30) Foreign Application Priority Data

Oct. 8, 2010   (JP) .................................. 2010-228711

(51) Int. Cl.
  *G01M 15/05*   (2006.01)
  *G01M 15/04*   (2006.01)
(52) U.S. Cl.
  CPC .................................. *G01M 15/042* (2013.01)
  USPC ....................................................... 73/114.68
(58) Field of Classification Search
  USPC .......................................... 73/114.68, 114.77
  See application file for complete search history.

(56) References Cited

U.S. PATENT DOCUMENTS

| | | | |
|---|---|---|---|
| 6,532,807 B1* | 3/2003 | Krauss ........................ | 73/114.68 |
| 6,763,709 B1* | 7/2004 | Haggett et al. .............. | 73/114.68 |
| 7,325,447 B2* | 2/2008 | Miyahara et al. .......... | 73/114.68 |
| 8,479,569 B2* | 7/2013 | Sugimoto .................. | 73/114.68 |
| 2010/0116228 A1* | 5/2010 | Fujimoto ..................... | 123/41.1 |
| 2011/0120216 A1* | 5/2011 | Sugimoto .................. | 73/114.68 |

FOREIGN PATENT DOCUMENTS

| | | |
|---|---|---|
| JP | 11117799 A | 4/1999 |
| JP | 2004-263613 A | 9/2004 |
| JP | 2006-233809 A | 9/2006 |
| JP | 2007218115 A | 8/2007 |
| JP | 2008185002 A | 8/2008 |
| JP | 2009074430 A | 4/2009 |
| JP | 2010007571 A | 1/2010 |

* cited by examiner

*Primary Examiner* — Eric S McCall
(74) *Attorney, Agent, or Firm* — Gifford, Krass, Sprinkle, Anderson & Citkowski, P.C.

(57) ABSTRACT

A malfunction determination apparatus for a cooling apparatus that cools an internal combustion engine by circulating a coolant through an interior of the internal combustion engine, using an electric pump, after the internal combustion engine is started includes: a detection portion that detects the coolant temperature; and a determination portion that determines a malfunction has occurred in a thermostat, if a state in which the detected coolant temperature remains below a first threshold temperature after the electric pump begins operating, following start of the internal combustion engine, continues for at least a pre-determined time. The thermostat is a thermostat for switching from a first passage for circulating the coolant without passage via an interior of a radiator of the cooling apparatus to a second passage for circulating the coolant via the interior of the radiator, as the coolant temperature rises.

11 Claims, 4 Drawing Sheets

APPARATUS, VEHICLE, AND METHOD FOR DETERMINING A THERMOSTAT MALFUNCTION IN AN ENGINE COOLING SYSTEM

CROSS REFERENCE TO RELATED APPLICATIONS

This application claims priority to Japanese Patent Application No. 2010-228711 filed on Oct. 8, 2010, which is incorporated herein by reference in its entirety including the specification, drawings and abstract.

BACKGROUND OF THE INVENTION

1. Field of the Invention

The invention relates to a technology of determining the presence or absence of occurrence of a malfunction of a cooling apparatus of an internal combustion engine. More particularly, the invention relates to a technology of highly accurately determining the presence or absence of occurrence of a malfunction of a thermostat in the case where coolant that passes via an interior of an internal combustion engine is circulated by an electric pump.

2. Description of Related Art

An internal combustion engine is provided with a cooling apparatus that cools component parts that are heated by heat that is produced by combustion. Such a cooling apparatus includes a thermostat. Due to the thermostat, during a warm-up during which the coolant temperature is below a threshold value, the coolant is circulated without passing through a radiator, and after the coolant temperature reaches the threshold value and the warm-up is completed, the coolant is circulated via the radiator. In this manner, the internal combustion engine is quickly warmed up, and is kept at an appropriate temperature. However, in the case where the thermostat becomes abnormal due to fixation or the like, the coolant can sometimes circulates via the radiator even during a warm-up, in which case the internal combustion engine cannot be quickly warmed up. Therefore, there is a need to highly accurately determine whether or not the cooling apparatus is abnormal.

To this end, Japanese Patent Application Publication No. 2004-263613 (JP-A-2004-263613) discloses a thermostat malfunction detection apparatus capable of detecting malfunction of a thermostat relatively highly accurately and easily even during a partially warmed-up state. This thermostat malfunction detection apparatus is a thermostat malfunction detection apparatus that detects malfunction of a thermostat provided in a circulation route of a coolant (cooling water) of an engine on the basis of a detected temperature of the cooling water and a temperature of the cooling water estimated on the basis of the state of operation of the engine, and that is characterized in that when the water temperature detected at the time of beginning the estimation of the water temperature satisfies a prescribed temperature condition, an electric fan that sends wind to the circulation route is driven.

According to the thermostat malfunction detection apparatus disclosed in the aforementioned patent application publication, it is determined that the engine is in partially warmed-up state, when the water temperature detected at the time of beginning the estimation of the water temperature satisfies the prescribed temperature condition. Therefore, merely by determining whether the rise of the detected water temperature is gentle, it can be determined whether or not the thermostat has an open-circuit malfunction. Hence, malfunction of the thermostat can easily be detected even during the partially warmed-up state.

However, in the case where coolant in a medium passage in a cooling apparatus is circulated by an electric water pump, there is possibility of false determination of the presence or absence of malfunction of the thermostat.

If an electric pump starts to be operated during operation of the internal combustion engine, the coolant heated due to the operation of the internal combustion engine passes as the electric pump is operated. Therefore, the detection value provided by a sensor that detects the coolant temperature rises temporarily. As a result, there is a possibility of false determination when the presence or absence of malfunction of the thermostat is to be determined through the use of the detection value from the sensor.

The water pump of the thermostat malfunction detection apparatus disclosed in the foregoing patent application publication uses the engine as a motive power source, and the aforementioned problems are not considered at all in conjunction with the disclosed construction.

SUMMARY OF THE INVENTION

The invention provides an malfunction determination apparatus and malfunction determination method that highly accurately determine the presence or absence of malfunction of a thermostat.

An malfunction determination apparatus in accordance with a first aspect of the invention is an malfunction determination apparatus for a cooling apparatus that cools an internal combustion engine by circulating a coolant through an interior of the internal combustion engine, using an electric pump, after the internal combustion engine is started. This malfunction determination apparatus includes: a detection portion that detects a coolant temperature; and a determination portion that determines a malfunction has occurred in a thermostat of the cooling apparatus, if a state in which the detected coolant temperature remains below a first threshold temperature after the electric pump begins operating, following start of the internal combustion engine, continues for at least a pre-determined time. The thermostat is a thermostat for switching from a first passage for circulating the coolant without passage via an interior of a radiator of the cooling apparatus to a second passage for circulating the coolant via the interior of the radiator, as the coolant temperature rises.

A malfunction determination method in accordance with a second aspect of the invention is a malfunction determination method for a cooling apparatus that cools an internal combustion engine by circulating coolant through an interior of the internal combustion engine, using an electric pump, after the internal combustion engine is started. This malfunction determination method includes: detecting a coolant temperature; and determining that a malfunction has occurred in a thermostat, if a state in which the detected coolant temperature remains below a first threshold temperature after the electric pump begins operating, following start of the internal combustion engine, continues for at least a pre-determined time. The thermostat is a thermostat for switching from a first passage for circulating the coolant without passage via an interior of a radiator of the cooling apparatus to a second passage for circulating the coolant via the interior of the radiator, as the coolant temperature rises.

According to the foregoing aspects of the invention, it can be determined that the thermostat is abnormal, if the pre-determined time elapses following the beginning of the state in which the coolant temperature is smaller than the first threshold temperature. Therefore, malfunction of the thermostat can be highly accurately detected. Hence, it is possible to provide a malfunction determination apparatus and an malfunction determination method that highly accurately determine the presence or absence of malfunction of the thermostat while restraining increases in cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described hereinafter with reference to the drawings. In the following description, the same component parts are denoted by the same reference characters. Those component parts are also the same in name and function. Therefore, detailed descriptions thereof will not be repeated.

Figure 1:
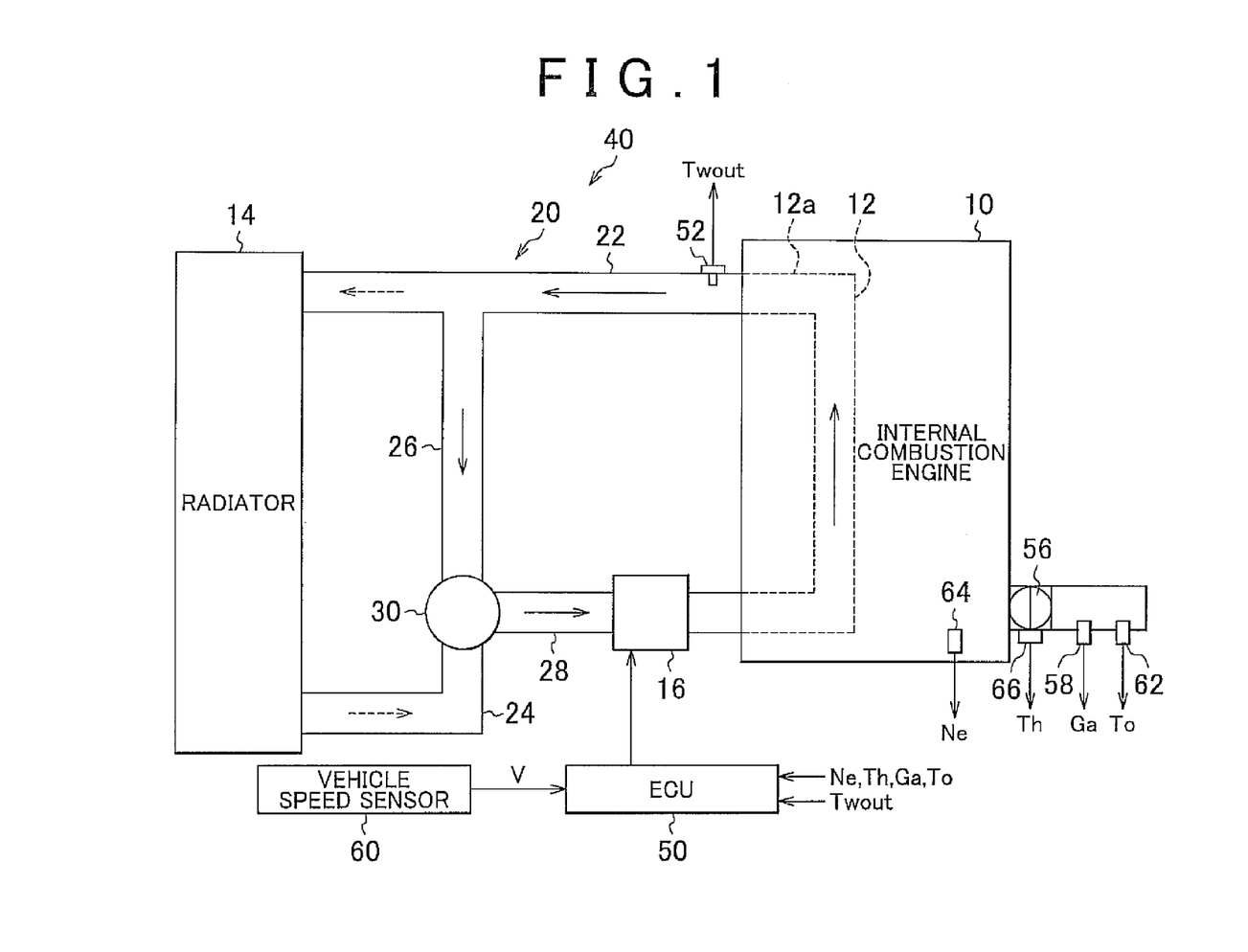
FIG. 1 is a diagram showing an overall construction of a cooling apparatus concerned with an embodiment of the invention.

As shown in FIG. 1, in an embodiment of the invention, a cooling apparatus 40 includes a water jacket 12 formed within an internal combustion engine 10, a radiator 14, a circulation passage 20 for circulating cooling water (coolant) between the radiator 14 and the water jacket 12, a thermostat 30 provided in an intermediate portion of the circulation passage 20, an electric water pump 16 provided in an intermediate portion of the circulation passage 20, and an ECU (Electronic Control Unit) 50. A malfunction determination apparatus in accordance with this embodiment is realized by the ECU 50. In this embodiment, the cooling apparatus 40 and the internal combustion engine 10 are mounted in a vehicle. The vehicle is not particularly limited as long as it is a vehicle that uses an internal combustion engine as a motive power source. For example, the vehicle may be a hybrid vehicle.

The thermostat 30 has a valve whose opening amount changes according to the temperature of a coolant that contacts the thermostat 30. By opening and closing the valve, the thermostat 30 automatically adjusts the amount of flow of the coolant that passes through the radiator 14. Incidentally, although the following description will be made on the assumption that the coolant is a cooling water, the coolant may be a liquid or a gas, and is not particularly limited cooling water. In the embodiment, as the coolant temperature rises, the thermostat 30 switches from a passage for circulating the coolant without passage through the radiator 14 to a passage for circulating the coolant via the radiator 14.

The circulation passage 20 includes a first passage 22, a second passage 24, a third passage 26 and a fourth passage 28. The first passage 22 is a passage for supplying the cooling water from the water jacket 12 to the radiator 14. The second passage 24 is a passage for circulating the cooling water that has been cooled by the radiator 14, to the water jacket 12 via the thermostat 30. The third passage 26 is a passage that branches from the first passage 22 so as to pass the cooling water to the water jacket 12 via the thermostat 30 without passage through the radiator 14. The fourth passage 28 is a passage for passing one of the current of the cooling water supplied from the second passage 24 and the current of the cooling water supplied from the third passage 26, or a mixture of the two currents, to the water jacket 12.

The thermostat 30 is provided in an intermediate portion of the circulation passage 20 which is a meeting portion between the second passage 24 and the third passage 26. In the embodiment, if the temperature of the cooling water is below a pre-temperature, the thermostat 30 blocks the passage of the cooling water from the second passage 24 to the fourth passage 28 and provides communication between the third passage 26 and the fourth passage 28. At this time, while the electric water pump 16 is operating, the cooling water circulates through the circulation passage 20 without passing through the radiator 14. The thermostat 30, if the temperature of the cooling water is higher than the pre-determined temperature, increases the amount of flow of the cooling water from the second passage 24 to the fourth passage 28. At this time, while the electric water pump 16 is operating, the cooling water circulates through the circulation passage 20 via the radiator 14.

The electric water pump 16 is provided in an intermediate portion of the fourth passage 28, and forces the cooling water within the circulation passage 20 to flow into the water jacket 12 through the fourth passage 28. According to a control signal from the ECU 50, the amount of flow through the electric water pump 16 is adjusted.

The ECU 50 is connected to an outlet temperature sensor 52, an air flow meter 58, a vehicle speed sensor 60, an intake air temperature sensor 62, a rotation speed sensor 64, and a throttle sensor 66.

The outlet temperature sensor 52 is provided in the vicinity of an outflow opening 12a for the cooling water from the water jacket 12 to the first passage 22, and detects the temperature of the cooling water flowing in the first passage 22 (hereinafter, also referred to as "outlet temperature Twout" or "actual water temperature"). The outlet temperature sensor 52 transmits to the ECU 50 a signal that shows the detected outlet temperature Twout.

The air flow meter 58 detects the intake air amount Ga that shows the amount of flow of air that passes within the intake passage. The air flow meter 58 transmits to the ECU 50 a signal that shows the detected intake air amount Ga.

The vehicle speed sensor 60 detects the speed V of the vehicle. The vehicle speed sensor 60 transmits to the ECU 50 a signal that shows the detected speed V of the vehicle.

The intake air temperature sensor 62 detects the intake air temperature To that shows the temperature of the air that passes within the intake passage. The intake air temperature sensor 62 transmits to the ECU 50 a signal that shows the detected intake air temperature To.

The rotation speed sensor 64 detects the rotation speed Ne of an output shaft of the internal combustion engine 10. The rotation speed sensor 64 transmits to the ECU 50 a signal that shows the detected rotation speed Ne of the output shaft of the internal combustion engine 10.

The throttle sensor 66 detects the degree of opening of the throttle valve 56 (hereinafter, referred to as "throttle opening degree") Th. The throttle sensor 66 transmits to the ECU 50 a signal that shows the detected throttle opening degree Th.

The ECU 50 receives the signals from the various sensors, and executes various programs such as a malfunction determination process and the like.

In the cooling apparatus 40 having a construction as described above, the ECU 50 determines whether or not the state of the thermostat 30 is abnormal, from the state of the vehicle based on the signals from the various sensors, during the warm-up after the internal combustion engine 10 is started.

For example, in the case where as the internal combustion engine 10 is started, the electric water pump 16 is operated to circulate the cooling water in the circulation passage 20, the ECU 50 estimates the outlet temperature on the basis of the state of the vehicle, and determines whether or not the state of the thermostat 30 is abnormal on the basis of a result of the comparison between the estimated temperature (hereinafter, termed the simulated water temperature Ts) and the outlet temperature Twout.

After the internal combustion engine 10 starts operating, the ECU 50, using an intake air temperature To at the time of start of the internal combustion engine 10 as an initial value, calculates the amount of change in temperature on the basis of the state of the vehicle, and adds the calculated amount of change in temperature to the initial value, and sets the summed value as a simulated water temperature Ts.

The ECU 50 calculates an estimated value of the amount of change in the outlet temperature by calculating the amount of heat generated and the amount of heat released per calculation cycle from the intake air amount Ga, the speed V of the vehicle and the state of operation of the internal combustion engine 10 in every calculation cycle, for example, through the use of maps or mathematical expressions or the like. Incidentally, it is desirable that the simulated water temperature Ts be a lower-limit value of a value that the outlet temperature can assume when the thermostat 30 is in a normal state.

The ECU 50 determines that the thermostat 30 is in the normal state, when the outlet temperature Twout reaches a first threshold temperature Tw(1) before the simulated water temperature Ts does.

On the other hand, if the simulated water temperature Ts reaches the first threshold temperature Tw(1) before the outlet temperature Twout does, the ECU 50 determines that a malfunction has occurred in the thermostat 30. The malfunction of the thermostat 30 is that a valve provided within the thermostat is fixed while the valve is open, and therefore the cooling water circulates through the circulation passage 20 via the radiator 14 although the temperature of the cooling water is low. Incidentally, the first threshold temperature Tw(1) is a threshold value of the temperature of the cooling water for determining that the warm-up of the internal combustion engine 10 has been completed, and the first threshold temperature Tw(1) is, for example, 75° C., but is not particularly limited so.

However, in the case where during the warm-up of the internal combustion engine 10, the cooling water in the circulation passage 20 is circulated by operating the electric water pump 16, the presence or absence of malfunction of the thermostat 30 can sometimes be falsely determined. Specifically, if the electric water pump 16 starts operating while the internal combustion engine 10 is operating, the cooling water residing in the water jacket 12 within the internal combustion engine 10 starts to pass to the circulation passage 20. The cooling water residing in the water jacket 12 is heated by heat generated due to the operation of the internal combustion engine 10, and therefore has higher temperature than the cooling water residing in the circulation passage 20.

Therefore, if the thermostat 30 should be in the abnormal state such that the cooling water circulates through the circulation passage 20 via the radiator 14, there still is possibility of the outlet temperature Twout exceeding the first threshold temperature Tw(1) on a temporarily basis because the cooling water residing in the water jacket 12 passes by the outlet temperature sensor 52. As a result, there is possibility of making a false determination that the thermostat 30 is in the normal state.

Accordingly, in the embodiment, the ECU 50 has a feature that the ECU 50 determines a malfunction has occurred in the thermostat 30 if the outlet temperature Twout is smaller (lower) than the first threshold temperature Tw(1) after the internal combustion engine 10 is started continues for at least a first time which is longer than a time for determining a malfunction of the thermostat when the internal combustion engine is started and the electric water pump is operated at the same time.

Besides, after an absolute value of the amount of change ΔTwout in the outlet temperature Twout within a prescribed time falls below a pre-determined value ΔTw(0) subsequently to the start of the internal combustion engine 10, the ECU 50 starts to determine whether a malfunction has occurred in the thermostat 30.

The ECU 50 determines that a malfunction has occurred in the thermostat 30 if the outlet temperature Twout is smaller than the first threshold temperature Tw(1) and the absolute value of the amount of change ΔTwout in the outlet temperature Twout is smaller than the pre-determined value ΔTw(0) continues for the first time.

The ECU 50 determines that the thermostat 30 is in the normal state in the case where after the absolute value of the amount of change ΔTwout in the outlet temperature Twout falls below the pre-determined value ΔTw(0), the outlet temperature Twout exceeds the first threshold temperature Tw(1) before the simulated water temperature Ts does.

Figure 2:
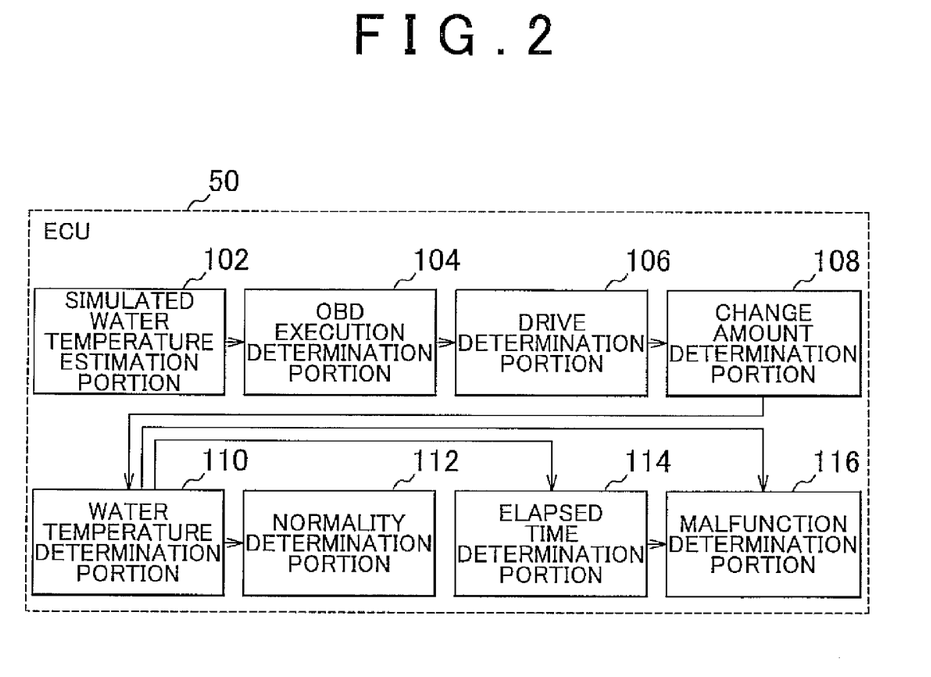
FIG. 2 is a functional block diagram of an ECU that is a malfunction determination apparatus in accordance with the embodiment.

FIG. 2 shows a functional block diagram of the ECU 50 in the embodiment. The ECU 50 includes a simulated water temperature estimation portion 102, an OBD execution determination portion 104, a drive determination portion 106, a change amount determination portion 108, a water temperature determination portion 110, a normality determination portion 112, an elapsed time determination portion 114, and a malfunction determination portion 116.

The simulated water temperature estimation portion 102 estimates a simulated water temperature Ts on the basis of the state of the internal combustion engine 10 after the internal combustion engine 10 starts operating. The method of estimating the simulated water temperature Ts has been described above, and detailed description thereof will not be repeated.

The OBD execution determination portion 104 determines whether or not a process for diagnosing whether the state of the thermostat 30 is abnormal or normal (hereinafter, the process will be simply termed the thermostat OBD (On-Board Diagnostics)) is being executed. The OBD execution determination portion 104 may determine that the thermostat OBD is being executed, for example, in the case where a flag that shows that the thermostat OBD is being executed is on. Alternatively, the OBD execution determination portion 104 may also determine that the thermostat OBD is being executed, for example, in the case where an execution condition for the thermostat OBD is satisfied.

The execution condition for the thermostat OBD is, for example, a condition that the internal combustion engine 10 is started in the case where the temperature of the cooling water is within a pre-determined range below the first threshold temperature Tw(1). The aforementioned flag that shows that the thermostat OBD is being executed may be turned on in the case where the aforementioned execution condition is satisfied.

Incidentally, the OBD execution determination portion 104 may turn on the execution determination flag, for example, in the case where the OBD execution determination portion 104 determines that the thermostat OBD is being executed.

The drive determination portion 106 determines whether or not the electric water pump 16 is being driven. The drive determination portion 106 may determine that the electric water pump 16 is being driven, for example, in the case where a flag that shows that the electric water pump 16 is being driven is on. Alternatively, the drive determination portion 106 may determine that the electric water pump 16 is being driven, for example, in the case where a condition for driving the electric water pump 16 is satisfied.

The condition for driving the electric water pump 16 is, for example, a condition that the temperature of the cooling water is higher than a second threshold value Tw(2). The aforementioned flag that shows that the electric water pump 16 is being driven may be turned on in the case where the aforementioned condition for driving the pump is satisfied.

Incidentally, the drive determination portion 106 may turn on the drive determination flag, for example, in the case where the drive determination portion 106 determines that the electric water pump 16 is being driven.

The change amount determination portion 108, in the case where the thermostat OBD is being executed and the electric water pump 16 is being driven, determines whether or not the simulated water temperature Ts is below the first threshold temperature Tw(1) and the absolute value of the amount of change ΔTwout is smaller than the pre-determined value ΔTw(0). The prescribed time may be a certain unit time, or may also be a time that corresponds to a prescribed number of calculation cycles.

Preferably, it is desirable that the prescribed time be set so that it is possible to calculate an amount of change in the outlet temperature Twout occurring in the case where the outlet temperature Twout rises beyond the first threshold temperature Tw(1) after the electric water pump 16 has been driven and an amount of change in the outlet temperature Twout occurring after the outlet temperature Twout exceeds the first threshold temperature Tw(1).

It is desirable that the pre-determined value ΔTw(0) be set so that an upper-limit value of the amount of change in the outlet temperature Twout in the case where the electric water pump 16 is operating and where the temperature of the whole cooling water within the circulation passage 20 rises by heat generated due to the operation of the internal combustion engine 10 is included in the pre-determined value ΔTw(0).

Besides, it is also desirable that the pre-determined value ΔTw(0) be set so as to be smaller than a lower-limit value of the amount of change in the outlet temperature Twout occurring in the case where the temperature of a portion of the cooling water within the circulation passage 20 rises by heat generated due to the operation of the internal combustion engine 10 while the electric water pump 16 is stopped.

Furthermore, it is desirable that the pre-determined value ΔTw(0) be set so as to be smaller than the lower-limit value of the amount of change ΔTwout in the outlet temperature Twout occurring in the case where the outlet temperature Twout rises beyond the first threshold temperature Tw(1) while the electric water pump 16 is operating.

Incidentally, the change amount determination portion 108 determines whether or not the simulated water temperature Ts is below the first threshold temperature Tw(1) and the absolute value of the amount of change ΔTwout is smaller than the pre-determined value ΔTw(0), in the case where the execution determination flag and the drive determination flag are both on. The change amount determination portion 108 may turn on a change amount determination flag, for example, in the case where the simulated water temperature Ts is below the first threshold temperature Tw(1) and the absolute value of the amount of change ΔTwout is smaller than the pre-determined value ΔTw(0).

The water temperature determination portion 110 determines whether or not the outlet temperature Twout is greater than or equal to the first threshold temperature Tw(1) in the case where the change amount determination portion 108 determines that the simulated water temperature Ts is below the first threshold temperature Tw(1) and that the absolute value of the amount of change ΔTwout is smaller than the pre-determined value ΔTw(0).

Incidentally, the water temperature determination portion 110 may determine whether or not the outlet temperature Twout is greater than or equal to the first threshold temperature Tw(1), for example, in the case where the change amount determination flag is on. Besides, the water temperature determination portion 110 may turn on a first water temperature determination flag, for example, in the case where it is determined that the outlet temperature Twout is greater than or equal to the first threshold temperature Tw(1).

Besides, the water temperature determination portion 110 may turn off the first water temperature determination flag, for example, in the case where it is determined that the outlet temperature Twout is smaller than the first threshold temperature Tw(1).

Furthermore, in the case where the change amount determination portion 108 determines that the simulated water temperature Ts is greater than or equal to the first threshold temperature Tw(1) or that the absolute value of the amount of change ΔTwout is greater than or equal to the pre-determined value ΔTw(0), the water temperature determination portion 110 determines whether or not the simulated water temperature Ts is greater than or equal to the first threshold temperature Tw(1) and the outlet temperature Twout is smaller than the first threshold temperature Tw(1).

Besides, the water temperature determination portion 110 may determine whether or not the simulated water temperature Ts is greater than or equal to the first threshold temperature Tw(1) and the outlet temperature Twout is smaller than the first threshold temperature Tw(1), for example, in the case where the change amount determination flag is off. Besides, the water temperature determination portion 110 may turn on a second water temperature determination flag, for example, in the case where it is determined that the simulated water temperature Ts is greater than or equal to the first threshold temperature Tw(1) and that the outlet temperature Twout is smaller than the first threshold temperature Tw(1).

Besides, the water temperature determination portion 110 may turn off the second water temperature determination flag in the case where it is determined that the simulated water temperature Ts is smaller than the first threshold temperature Tw(1) or that the outlet temperature Twout is greater than or equal to the first threshold temperature Tw(1).

The normality determination portion 112 determines that the thermostat 30 is in the normal state in the case where the simulated water temperature Ts is smaller than the first threshold temperature Tw(1) and where after the absolute value of the amount of change ΔTwout falls below the pre-determined value ΔTw(0), the outlet temperature Twout becomes greater than or equal to the first threshold temperature Tw(1). Incidentally, the normality determination portion 112 may determine that the thermostat 30 is in the normal state, for example, in the case where the first water temperature determination flag is on.

The elapsed time determination portion 114 determines whether or not at least a pre-determined time has elapsed subsequently to the absolute value of the amount of change ΔTwout having become smaller than the pre-determined value ΔTw(0), in the case where the change amount determination portion 108 determines that the simulated water temperature Ts is below the first threshold temperature Tw(1) and that the amount of change ΔTwout is smaller than the pre-determined value ΔTw(0) and where the water temperature determination portion 110 determines that the outlet temperature Twout is below the first threshold temperature Tw(1). Although the aforementioned pre-determined time is not particularly limited, the pre-determined time may be set, for example, on the basis of the time required for the circulation of the cooling water through the circulation passage 20.

Incidentally, the elapsed time determination portion 114 may determine whether or not at least the pre-determined time has elapsed subsequently to the amount of change ΔTwout having become smaller than the pre-determined value ΔTw(0), for example, in the case where the change amount determination flag is on and where the first water temperature determination flag is off. Furthermore, the elapsed time determination portion 114 may also turn on an elapse determination flag in the case where it is determined that at least the pre-determined time has elapsed.

The malfunction determination portion 116 determines that a malfunction has occurred in the thermostat 30 if the absolute value of the amount of change ΔTwout is greater than or equal to the pre-determined value ΔTw(0), and where the simulated water temperature Ts is greater than or equal to the first threshold temperature Tw(1), and where the outlet temperature Twout is smaller than the first threshold temperature Tw(1). Incidentally, the malfunction determination portion 116 may determine that a malfunction has occurred in the thermostat 30 if, for example, the second water temperature determination flag is on.

Furthermore, the malfunction determination portion 116 determines that a malfunction has occurred in the thermostat 30 if it is determined that at least the pre-determined time has elapsed subsequently to the absolute value of the amount of change ΔTwout having become smaller than the pre-determined value ΔTw(0). Incidentally, the malfunction determination portion 116 may also determine that a malfunction has occurred in the thermostat 30, for example, when the first water temperature determination flag is off and the elapse determination flag is on.

In this embodiment, each of the simulated water temperature estimation portion 102, the OBD execution determination portion 104, the change amount determination portion 108, the water temperature determination portion 110, the normality determination portion 112, the elapsed time determination portion 114 and the malfunction determination portion 116 is described as a device that functions as a software device and that is realized by a CPU (Central Processing Unit) of the ECU 50 executing a program stored in a storage; however, these portions may also be realized as hardware devices. Incidentally, these programs are recorded in a storage medium that is mounted in a vehicle.

Figure 3:
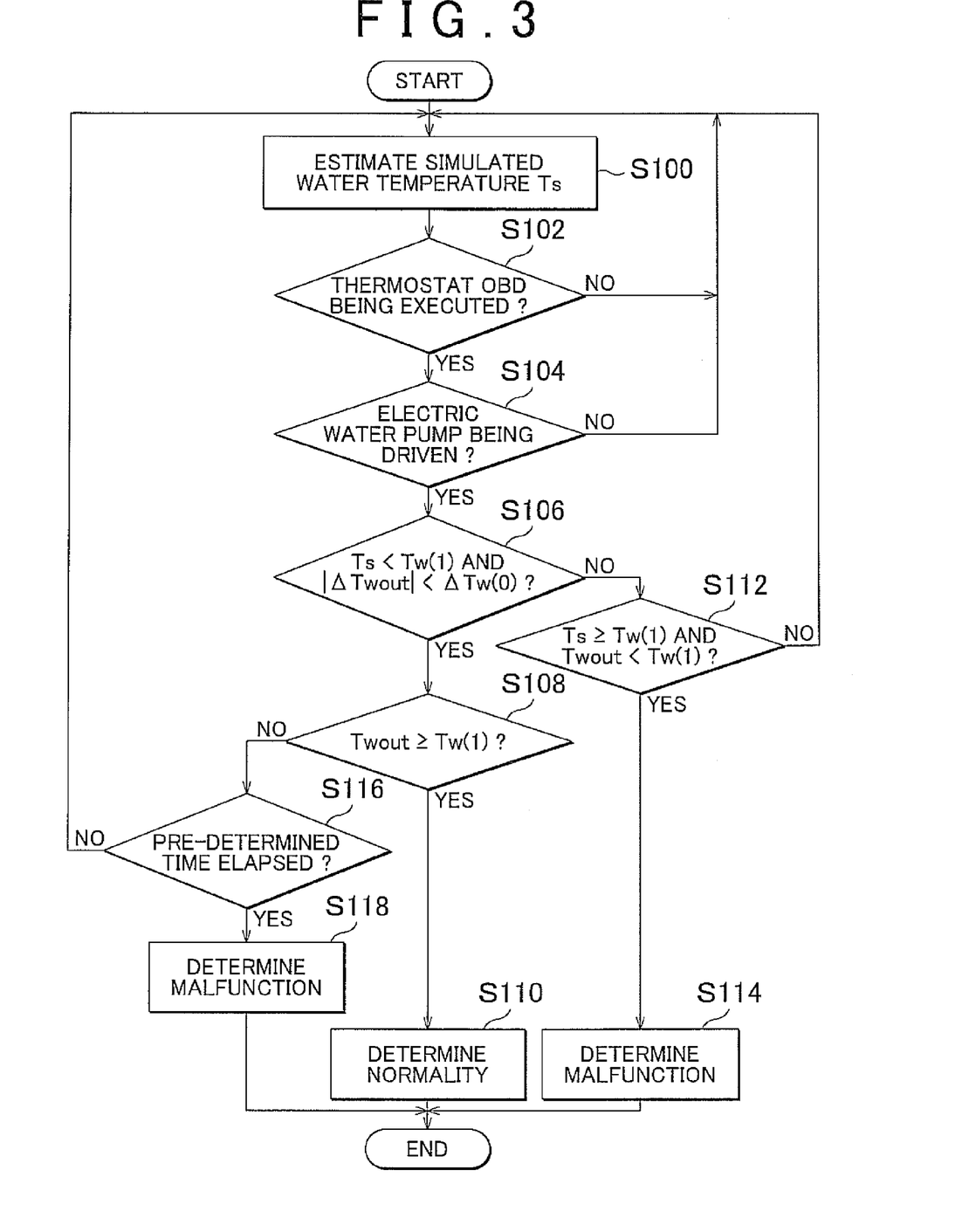
FIG. 3 is a flowchart showing a control structure of a program that is executed by the ECU that is the malfunction determination apparatus in accordance with the embodiment.

A control structure of a program executed by the ECU 50, which is a malfunction determination apparatus in accordance with the embodiment, will be described with reference to FIG. 3.

In step (hereinafter, "step" will be termed "S") 100, the ECU 50 estimates a simulated water temperature Ts. In S102, the ECU 50 determines whether or not the thermostat OBD is being executed. If the thermostat OBD is being executed (YES in S102), the process proceeds to S104. If not (NO in S102), the process returns to S100. Incidentally, the method of determining whether or not the thermostat OBD is being executed is just as described above, and will not be described in detail again.

In S104, the ECU 50 determines whether or not the electric water pump 16 is being driven. If the electric water pump 16 is being driven (YES in S104), the process proceeds to S106. If not (NO in S104), the process returns to S100. Incidentally, the method of determining whether not the electric water pump 16 is being driven is just as described above, and will not be described in detail again.

In S106, the ECU 50 determines whether or not the simulated water temperature Ts is smaller than the first threshold temperature Tw(1) and the absolute value of the amount of change ΔTwout is smaller than the pre-determined value ΔTw(0). If the simulated water temperature Ts is smaller than the first threshold temperature Tw(1) and the absolute value of the amount of change ΔTwout is smaller than the pre-determined value ΔTw(0) (YES in S106), the process proceeds to S108. If not (NO in S106), the process proceeds to S112.

In S108, the ECU 50 determines whether or not the outlet temperature Twout is greater than or equal to the first threshold temperature Tw(1). If the outlet temperature Twout is greater than or equal to first threshold temperature Tw(1) (YES in S108), the process proceeds to S110. If not (NO in S108), the process proceeds to S116.

In S110, the ECU 50 determines that the thermostat 30 is in the normal state. In S112, the ECU 50 determines whether or not the simulated water temperature Ts is greater than or equal to first threshold temperature Tw(1) and the outlet temperature Twout is smaller than the first threshold temperature Tw(1). If the simulated water temperature Ts is greater than or equal to first threshold temperature Tw(1) and the outlet temperature Twout is smaller than first threshold temperature Tw(1) (YES in S112), the process proceeds to S114. If not (NO in S112), the process returns to S100. In S114, the ECU 50 determines that a malfunction has occurred in the thermostat 30.

In S116, the ECU 50 determines whether or not the pre-determined time has elapsed subsequently to the absolute value of the amount of change ΔTwout having become smaller than the pre-determined value ΔTw(0). If it is determined that the pre-determined time has elapsed (YES in S116), the process proceeds to S118. If not (NO in S116), the process returns to S100. In S118, the ECU 50 determines that a malfunction has occurred in the thermostat 30.

Figure 4:
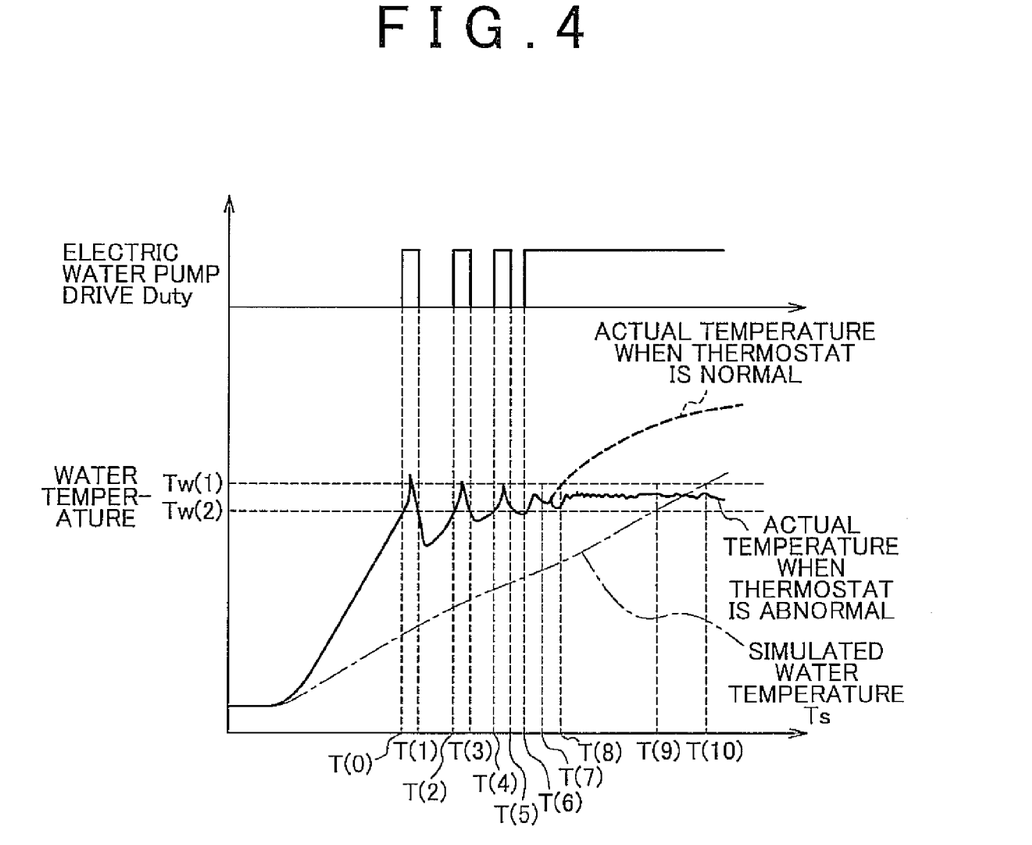
FIG. 4 is a timing chart showing operations of the ECU that is the malfunction determination apparatus in accordance with the embodiment.

Operations of the ECU 50 that realizes the malfunction determination apparatus in accordance with this embodiment based on the structure and the flowchart described above will be described below with reference to FIG. 4.

After the internal combustion engine 10 starts operating, estimation of a simulated water temperature Ts is started (S100). The simulated water temperature Ts is subjected to accumulation of amounts of rise in temperature based on the history of operation of the internal combustion engine 10. Therefore, the simulated water temperature Ts rises as time elapses, as shown by a one-dot chain line in FIG. 4.

On another hand, as shown by a solid line in FIG. 4, while the outlet temperature Twout is below the second threshold value Tw(2) (70° C.), the electric water pump 16 remains stopped. Therefore, the temperature of the cooling water within the water jacket 12 rises by heat generated due to the operation of the internal combustion engine 10. As heat from the internal combustion engine 100 transfers to the cooling water residing in the circulation passage 20, the ambient temperature of the outlet temperature sensor 52, that is, the outlet temperature Twout, rises.

If the internal combustion engine 10 is started when the temperature of the cooling water is within a pre-determined range below the first threshold temperature Tw(1), the execution condition for the thermostat OBD is satisfied. At this time, it is determined that the thermostat OBD is being executed (YES in S102).

At time T(0), when the outlet temperature Twout becomes greater than the second threshold value Tw(2), the condition for driving the electric water pump 16 is satisfied. Therefore, the ECU 50 drives the electric water pump 16. As a result, it is determined that the electric water pump 16 is being driven (YES in S104).

Even when, between time T(0) and time T(1), there exists a period during which the outlet temperature Twout exceeds Tw(1), neither the determination of normality nor the determination of malfunction is made in the case where the absolute value of the amount of change ΔTwout is greater than the pre-determined value ΔTw(0) and where the simulated water temperature Ts does not reach the first threshold temperature Tw(1) before the outlet temperature Twout does (NO in S106 and NO in S112).

Due to the operation of the electric water pump 16, the cooling water starts to circulate, so that the cooling water around the outlet temperature sensor 52 moves. Then, the cooling water heated in the water jacket 12 due to the operation of the internal combustion engine 10 prior to the operation of the electric water pump 16 contacts the outlet temperature sensor 52, so that the output value of the outlet temperature sensor 52 sharply rises. After that, the cooling water having resided within the fourth passage 28 prior to the operation of the electric water pump 16 comes into contact with the outlet temperature sensor 52, so that the output value of the outlet temperature sensor 52 sharply drops.

At time T(1), when the outlet temperature Twout is below the second threshold value Tw(2), the condition for driving the electric water pump 16 is not satisfied. Therefore, the ECU 50 stops the driving of the electric water pump 16 (NO in S104).

Then, since the circulation of the cooling water stops, the temperature of the cooling water within the water jacket 12 rises again because of heat generated due to operation of the internal combustion engine 10. As heat from the internal combustion engine 10 transfers to the cooling water residing in the circulation passage 20, the outlet temperature Twout rises. At time T(2), when the outlet temperature Twout becomes greater than the second threshold value Tw(2), the condition for driving the electric water pump 16 is satisfied. Therefore, the ECU 50 drives the electric water pump again.

Incidentally, the change in the temperature of the cooling water during a period from time T(2) to time T(4), and the operation of the electric water pump 16 and the change in the temperature of the cooling water caused by the operation of the electric water pump 16 during a period from time T(4) to time T(6) are substantially the same as the operation and the change during the period from time T(0) to time T(2), and will not be described in detail again.

In the case where the thermostat 30 is in the normal state, the cooling water passing through the water jacket 12 flows through the circulation passage 20 without flowing through the radiator 14. Therefore, because of heat generated due to the operation of the internal combustion engine 10, the temperature of the cooling water rises. As the change in the temperature of the cooling water as shown during the period from the time T(0) to the time T(2) is repeated, the non-uniform temperature distribution of the cooling water within the circulation passage 20 disappears. Besides, the period of an intermittent stop of the electric water pump 16 is reduced. Therefore, the period during which the cooling water is locally heated is reduced. In consequence, sharp increases and decreases of the temperature caused by intermittent movements of the cooling water are restrained.

From time T(6) on, the outlet temperature Twout is kept greater than the second threshold value Tw(2), so that the operation of the electric water pump 16 continues. At time T(7), the simulated water temperature Ts falls below Tw(1) and the absolute value of the amount of change ΔTwout falls below the pre-determined value ΔTw(0) (YES in S106). After that, the electric water pump 16 continues operating, so that the temperature of the cooling water within the circulation passage 20 uniformly rises as shown by an interrupted line in FIG. 4. As a result, at time T(8), the outlet temperature Twout exceeds the first threshold temperature Tw(1) before the simulated water temperature Ts does (YES in S108), and it is determined that the thermostat 30 is normal (S110).

For example, a case where the valve of the thermostat 30 becomes fixed while the thermostat 30 causes the cooling water to circulate via the radiator 14 is assumed.

The changes occurring during the period of time T(0) to time T(7) are substantially the same as the above-described changes occurring when the thermostat 30 is normal, and will not be described in detail again.

At time T(7), the state in which the simulated water temperature Ts<Tw(1) and the amount of change in the outlet temperature Twout is smaller than the pre-determined value ΔTw(0) (YES in S106) comes about. At this time, the cooling water circulates in the circulation passage 20 via the radiator 14. Therefore, the heat transferred from the internal combustion engine 10 to the cooling water is released at the radiator 14. In the case where the quantity of heat transferred from the internal combustion engine 10 and the quantity of heat released at the radiator 14 are substantially equal, change of the outlet temperature Twout is restrained. As shown by the solid line in FIG. 4, in the case where the outlet temperature Twout is less than the first threshold temperature Tw(1) (NO in S108) and this state continues to time T(9) at which the pre-determined time elapses (YES in S116), it is determined that a malfunction has occurred in the thermostat 30 (S118).

For example, a case where the valve of the thermostat 30 becomes fixed while the thermostat 30 causes the cooling water to circulate via the radiator 14 is assumed.

The changes occurring during the period of time T(0) to time T(7) are substantially the same as the above-described changes occurring when the thermostat 30 is normal, and will not be described in detail again.

At time T(7), the state in which simulated water temperature Ts<Tw(1) and the amount of change in the outlet temperature Twout is smaller than the pre-determined value (YES in S106) comes about. At this time, the cooling water circulates in the circulation passage 20 via the radiator 14. Therefore, heat transferred from the internal combustion engine 10 to the cooling water is released at the radiator 14. In the case where the quantity of heat released at the radiator 14 is larger than the quantity of heat transferred from the internal combustion engine 10, the outlet temperature Twout sharply decreases. As a result, at time T(10), when the simulated water temperature Ts exceeds the first threshold temperature Tw(1) before the outlet temperature Twout does (YES in S112) in the case where the absolute value of the amount of change ΔTwout is greater than the pre-determined value ΔTw(0) (NO in S106), it is determined that a malfunction has occurred in the thermostat 30 (S114). Alternatively, when the outlet temperature Twout is smaller than first threshold temperature Tw(1) (YES in S112) in the case where the simulated water temperature Ts has exceeded the first threshold temperature Tw(1) (NO in S106), it is determined that a malfunction has occurred in the thermostat 30 (S114).

Thus, according to the malfunction determination apparatus in accordance with the embodiment, malfunction of the thermostat can be diagnosed on the basis of the temperature of the cooling water without a need to newly provide a component part for detecting malfunction of the thermostat. Therefore, cost increase can be restrained. Furthermore, it is also possible to restrain the making of a false determination that the thermostat is normal in the case where the outlet temperature Twout exceeds the first threshold temperature Tw(1) because of movement of a locally heated portion of the cooling water. Furthermore, malfunction of the thermostat can be detected on the basis of whether or not the state in which the amount of change ΔTwout is smaller than the pre-determined value ΔTw(0) continues for a pre-determined time. Therefore, malfunction of the thermostat can be detected before the simulated water temperature reaches the first threshold temperature Tw(1). Hence, it is possible to provide a malfunction determination apparatus and an malfunction determination method that highly accurately determine the presence or absence of malfunction of the thermostat while restraining increases in cost.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A vehicle comprising:
an internal combustion engine;
a radiator;
a coolant that cools the internal combustion engine;
a sensor that detects a temperature of the coolant;
an electric water pump that circulates the coolant through an interior of the internal combustion engine through a first passage or a second passage, the first passage circulates the coolant without passing through the radiator, and the second passage circulates the coolant through the radiator;
a thermostat that switches the circulation of the coolant from the first passage to the second passage as the temperature of the coolant rises; and
an electronic control unit that determines a malfunction of the thermostat based on the detected coolant temperature;
wherein the electric water pump starts circulation of the coolant after a first predetermined time after the internal combustion engine is started, and the electronic control unit determines the malfunction of the thermostat when a second predetermined time has elapsed after the electric water pump starts circulation of the coolant, the second predetermined time is longer than a time for determining the malfunction of the thermostat when the internal combustion engine is started and the electric water pump is operated at the same time.

2. The vehicle according to claim 1, wherein the electronic control unit begins determining whether the malfunction has occurred in the thermostat, after an absolute value of an amount of change in the temperature within a prescribed time falls below a pre-determined value after the internal combustion engine is started.

3. The vehicle according to claim 2, wherein the electric water pump starts operating when the detected coolant temperature exceeds a second threshold temperature that is lower than a first threshold temperature.

4. The vehicle according to claim 2, wherein the electronic control unit determines that the malfunction has occurred in the thermostat, when a state in which the detected coolant temperature remains below a first threshold temperature and the absolute value of the amount of change in the temperature is below the pre-determined value continues for at least the second predetermined time.

5. The vehicle according to claim 4, wherein the second predetermined time is one hour.

6. The vehicle according to claim 2, further comprising a calculation portion that calculates an estimated coolant temperature, which increases as the internal combustion engine is operated,
wherein the electronic control unit determines that the thermostat is operating normally, when, after the absolute value of the amount of change in the temperature falls below the pre-determined value, the detected coolant temperature exceeds a first threshold temperature before the estimated coolant temperature does.

7. The vehicle according to claim 6, wherein the electronic control unit determines that the malfunction has occurred in the thermostat, when the estimated coolant temperature exceeds the first threshold temperature before the detected coolant temperature does.

8. A malfunction determination method for a cooling apparatus that cools an internal combustion engine by circulating coolant, using an electric water pump, through an interior of the internal combustion engine through a first passage or a second passage, the first passage circulates the coolant without passing through a radiator, and the second passage circulates the coolant through the radiator, the malfunction determination method comprising:
starting the internal combustion engine;
starting the electric water pump to circulate the coolant after a first predetermined time after the internal combustion engine is started;
detecting a coolant temperature;
switching the circulation of the coolant from the first passage to the second passages as the detected coolant temperature rises; and
determining that a malfunction has occurred in the thermostat based on the detected coolant temperature when a second predetermined time has elapsed after the electric water pump starts circulation of the coolant, the second predetermined time is longer than a time for determining the malfunction of the thermostat when the internal combustion engine is started and the electric water pump is operated at the same time.

9. A malfunction determination apparatus for a cooling apparatus that cools an internal combustion engine by circulating a coolant through an interior of the internal combustion engine, using an electric pump, after the internal combustion engine is started, the malfunction determination apparatus comprising:
calculation portion that calculates an estimated coolant temperature, which increases as the internal combustion engine is operated,
a detection portion that detects a coolant temperature; and
a determination portion that determines a malfunction has occurred in a thermostat of the cooling apparatus, when a state in which the detected coolant temperature remains below a first threshold temperature after the electric pump begins operating, following start of the internal combustion engine, continues for at least a pre-determined time, wherein the determination portion determines that the thermostat is operating normally, when, after an absolute value of an amount of change in the coolant temperature within a prescribed time falls below a pre-determined value after the internal combustion engine is started, the detected coolant temperature exceeds the first threshold temperature before the estimated coolant temperature does, wherein the thermostat is a thermostat for switching from a first passage for circulating the coolant without passage via an interior of a radiator of the cooling apparatus to a second passage for circulating the coolant via the interior of the radiator, as the coolant temperature rises.

10. The malfunction determination apparatus according to claim 9, wherein the determination portion begins determining whether the malfunction has occurred in the thermostat, after the absolute value of the amount of change in the coolant temperature within the prescribed time falls below the pre-determined value after the internal combustion engine is started.

11. The malfunction determination apparatus according to claim 10, wherein the determination portion determines that the malfunction has occurred in the thermostat, when the estimated coolant temperature exceeds the first threshold temperature before the detected coolant temperature does.

* * * * *

UNITED STATES PATENT AND TRADEMARK OFFICE
CERTIFICATE OF CORRECTION

| | | |
|---|---|---|
| PATENT NO. | : 8,839,665 B2 | Page 1 of 1 |
| APPLICATION NO. | : 13/267930 | |
| DATED | : September 23, 2014 | |
| INVENTOR(S) | : Takahiro Nishigaki | |

It is certified that error appears in the above-identified patent and that said Letters Patent is hereby corrected as shown below:

In the Claims

At column 14, claim number 9, line number 62, before "calculation", Insert --a--

Signed and Sealed this
Thirtieth Day of June, 2015

Michelle K. Lee
*Director of the United States Patent and Trademark Office*